Dec. 16, 1969  B. D. STANTON  3,484,590

SYSTEM FOR CASCADING CONTROL FUNCTIONS

Filed Feb. 28, 1966

INVENTOR:
B. D. STANTON
BY:
HIS ATTORNEY

United States Patent Office 3,484,590
Patented Dec. 16, 1969

3,484,590
SYSTEM FOR CASCADING CONTROL FUNCTIONS
Benjiman D. Stanton, Walnut Creek, Calif., assignor to Shell Oil Company, New York, N.Y., a corporation of Delaware
Filed Feb. 28, 1966, Ser. No. 530,560
Int. Cl. G06f 15/46; G06g 7/58
U.S. Cl. 235—151.12    6 Claims

ABSTRACT OF THE DISCLOSURE

A control for obtaining the ratio of two phenomena wherein two auxiliary capacitors are charged in proportion to the two phenomena whose ratio is desired, including a means to cascade an independent variable with one of the phenomena.

---

Figure 1:
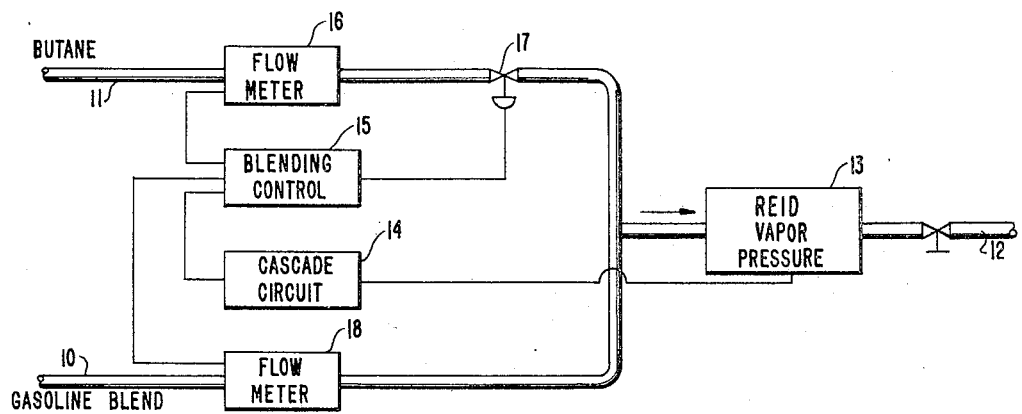

This invention relates to control systems, and more particularly to control systems that control a plurality of phenomena.

Many industrial applications especially in the chemical and petroleum industries require the control of the ratio between two phenomena that vary with time. Normally this type of control is required by inline blending systems where two materials are blended together to provide a mixture or blend of the two. It is necessary that the blending controller provide an accurate blend of the materials with time and insure that the final product meets the desired specifications. In Patent 3,089,643 there is described and claimed a ratio controller utilizing a capacitance bridge. The bridge consists of two capacitors charged in proportion to the magnitude of the rate of flow in the two streams. The two capacitors are discharged in opposition into a reservoir capacitor with the charge on the reservoir capacitor being used as a control signal.

While above system has been successfully used it makes no provision for cascading an additional control function with the blending circuit. In many processes it is desirable to blend two components to form a mixture while at the same time maintaining a characteristic of the mixture within preset limits. For example butane is blended with the gasoline to provide a fuel having a desired volatility. The desired ratio between the butane and gasoline can be set but as the gasoline blend varies it is necessary to vary the ratio of butane to maintain the desired volatility. Thus it is necessary to control the ratio of the blend between butane and the gasoline in response to the vapor pressure of the final blend. This requires that the vapor pressure of the final blend be cascaded with the blending controller.

The present invention solves the above problems by providing an apparatus by which an independent control variable can be cascaded with a normal blending or ratio controller. The invention utilizes the ratio controller described and claimed in Patent 3,089,643 and cascades with the controller a signal representing an independent variable. The independent variable is introduced by a circuit comprising an operational amplifier having a capacitor disposed in its feedback circuit. Thus the operational amplifier operates as an integrator to provide an output signal related to the time integral of the input signal. The output signal from the operational amplifier is coupled to the summing junction of the memory circuit of the blending controller. A resistance is placed in the coupling between the operational amplifier and the capacitance bridge to limit the magnitude of the signal that is added to the signal of the bridge. The amplifier is also provided with a switch means that shorts the amplifier output to its input to remove the effect of the independent variable from the controller.

In addition the amplifier is provided with a means for automatic start-up that uses a time delay relay to provide a preset time delay. The relay is closed at start-up to short the amplifier output to its input. Thus the effect of the independent variable is removed from the blending control, being added a preset time later when the relay opens.

The system can also be used to measure the quantity of one material present in the blend. For example assume that butane is being blended with gasoline at a fixed ratio and the Reid vapor pressure is to be maintained at 8 pounds per square inch. If the Reid vapor pressure is correct there will be no voltage signal present in the output of the cascade circuit. In this condition the ratio voltage supply will be related to the quantity of butane in the blend. If the Reid vapor pressure changes then the cascade control will have an output voltage and the quantity of butane in the blend will be changed. To determine the new ratio of butane to gasoline the ratio voltage is varied until the signal from the cascade circuit goes to zero. The ratio voltage will then be related to the quantity of butane in the blend.

The amplifier of the cascade circuit operates to supply either a positive or negative voltage to the controller. Thus the cascade circuit is capable of either over correcting or under correcting the ratio controller.

The combination of a manual switch and time delay relay provides a ready means by which the cascade controller may be automatically removed from the system or cascaded with the system. The automatic operation will switch in the cascade control without causing upsets or other oscillation of the basic control system. The bumpless addition of the cascade control to the ratio control results from the fact that the output of the cascade amplifier is zero until the switch shorting its output to its input is opened. Thus the cascade controller will have a zero output at the time it is switched into the control circuit.

Figure 2:
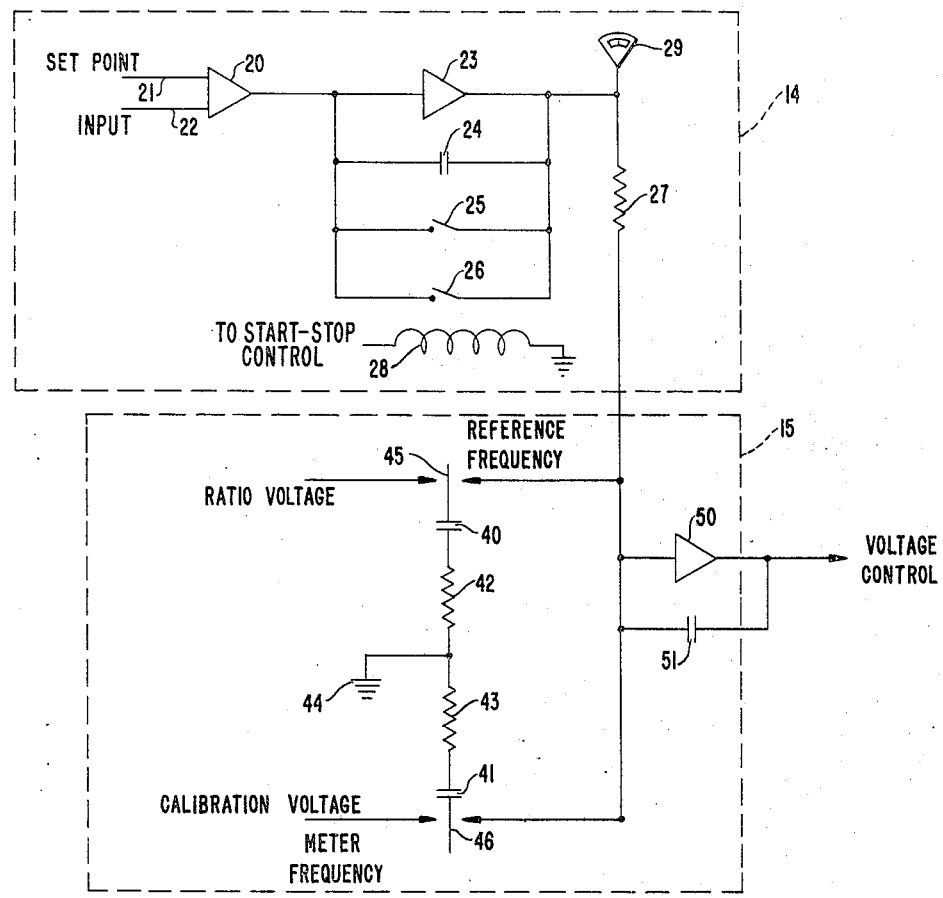

The above advantages in operation of the control system will be more easily understood from the following detailed description when taken in conjunction with the attached drawings in which:

FIGURE 1 is the block program of a blending control using the cascade circuit of this invention; and FIGURE 2 is a schematic diagram partially in block form showing incorporation of the cascade circuit with the blending controller of the above patent.

Shown in FIGURE 1 are two flow streams 10 and 11 containing a gasoline blend and butane, respectively. It is desired to blend two streams and provide a gasoline mixture at discharge line 12 containing a set percentage of butane in the mixture. In addition to requiring a fixed amount of butane in the flow stream 12 it is also required that the Reid vapor pressure of the final mixture remain with preset limits. The requirement that the vapor pressure remain within preset limits is to be maintained regardless of the percentage of butane in the mixture. Thus the amount of butane is varied to maintain the vapor pressure. The vapor pressure can be measured by various commercial devices which measure the vapor pressure and supply an electrical analog signal related thereto as shown at 13 in FIGURE 1. The devices for measuring the vapor pressure are slow response devices and cannot be directly used to control the blending process. Thus one can set the approximate ratio of butane to gasoline in the ratio controller and initiate the blending operation. As data becomes available from the vapor pressure measuring device 13 the cascade circuit will correct or adjust the ratio controller.

The analog signal from the vapor pressure monitor 13 is supplied to a cascade circuit 14 that supplies its signal to the blending controller 15. The blending controller 15 is a ratio controller of the type described and claimed in the above-reference patent. This type of blending controller accepts the signal of the flow meters 16 and 18 and controls the flow in the line 11 in response to the flow rates and the desired ratio. The blending controller normally operates through a controller (not shown) to position the valve 17 to vary the flow in a line 11.

While the above system is described with relation to the blending of butane and gasoline while maintaining the vapor pressure of the mixture within desired limits, it obviously can be used for many purposes. In place of vapor pressure it may be desirable to control the viscosity or temperature of the blended mixture; likewise it may be desirable to blend two mixtures together having a preset ratio while maintaining a separate characteristic of the blended mixture within limits. Thus the invention should not be limited to the particular blending system described.

Referring to FIGURE 2 the details of the cascade circuit are shown. The cascade circuit 14 consists of summing device 20 having an input signal 22 representing the variable that is to be controlled and a set point 21. The summing device 20 while indicated as being a summing amplifier can consist of two input resistors and an operational amplifier having a resistor in its feedback circuit. The summing device 20 supplies an output signal related to the difference between the input signal 22 and the set point 21. In the example given in FIGURE 1 the input 22 would represent the measured vapor pressure and the set point 21 would represent the desired vapor pressure. The signal from the summing device 20 can be either positive or negative; thus the cascade control is in effect a four quadrant controller and the control can either increase or decrease the amount of one material being blended with the second material. Also when the ratio set by the ratio controller holds the correct vapor pressure the output of the cascade control will be zero.

The output signal from the summing device 20 is supplied to an operational amplifier 23 having a capacitor 24 disposed in its feedback circuit. Thus the operational amplifier 23 will act as an integrating circuit and supply an output signal related to the time integral of the input signal. The output signal from the amplifier 23 may be displayed on a meter 29 in order that the percentage of one material in the mixture may be determined as explained above.

A manual switch 25 is provided for shorting the output of the operational amplifier 23 to its input in order that the effect of the independent variable may be removed from the blending controller. The amplifier 23 is also provided with a time delay relay 28 that operates a set of contacts 26. The time delay relay is provided so that during start-up or unusual operation the effect of the independent variable may be automatically removed from the blending controller and added automatically after a preset delay. This permits the blending controller to be started and approach the desired blend of the two materials before the independent variable is added to the system. In the absence of this provision at start-up the independent variable control would signal for a maximum flow of one constituent. This would have the effect of delaying the time required for the blending controller to achieve the desired blend between the two materials.

The signal from the amplifier 23 is summed with the discharge currents of the capacitors of the blending controller bridge. The connection between the operational amplifier 23 and the blending controller includes a series resistance 27. This resistance is designed to limit the current flow from the amplifier 23 and thus in effect control the amount of control that the cascade circuit may exercise over the blending controller. The current flow may be limited to various values, for example, the resistance 27 may be sized to limit the current flow from the amplifier to plus or minus 10 percent of the current flow from capacitors 40 and 41.

The blending controller 15 uses two capacitors 40 and 41 that form a bridge with the capacitors being connected to a common ground 44 through resistances 42 and 43, respectively. Capacitor 40 is alternately charged from the ratio voltage and discharged to the integrating amplifier 50 by means of a relay 45. The relay 45 is operated at a frequency related to the flow in line 10 or a reference frequency. The reference frequency can be any fixed frequency source for example 60 cycles may be used.

In a system where only two materials are to be blended a frequency related to the flow rate of one material is used to control the relay 45. In contrast in systems where a plurality of materials are to be blended the flow in each stream is controlled as a ratio of a reference frequency. This of course requires the use of a separate blending control 15 and control valve 17 for each stream. These features are more particularly described and claimed in a copending application Ser. No. 549,336, filed May 11, 1966.

Capacitor 41 is alternately charged from a calibration voltage and discharged to the integrating amplifier 50 by means of a relay switch 46. The relay 46 is operated from a source having a frequency related to the flow in the line 11. Turbine meters may be used for the flow meters 16 and 18 and will supply output signals having a frequency related to the flow through the line 10 and 11. The integrating amplifier 50 may be a conventional operational amplifier having a capacitor 51 disposed in its feedback circuit.

The capacitor 51 will act as a reservoir capacitor for the difference in magnitude between the two charges delivered by capacitors 40 and 41 in addition to the signal from the operational amplifier 23. The amplifier 50 will supply an output signal that is equal and opposite to the charge on capacitor 51. This output signal will be the time integral of the net input signal and is used as a control signal. Normally the signal from the amplifier 50 is supplied to a conventional controller 52 having integrating action and the controller positions the valve 17.

From the above description it is seen that the control system of this invention provides a means by which an independent variable can be cascaded with a blending controller. In addition the independent variable is added in a bumpless manner so that it does not upset or disturb operation of the blending controller. The independent variable has a zero value at the time it is cascaded with the blending controller. Thus it cannot disturb the operation of the blending controller. This operation is possible since the cascade control operates in all four quadrants and zero is a meaningful value for the independent variable. The system also includes a series resistance between the independent variable and the blending controller to limit the influence of the independent variable over the blending controller. Thus the system can cascade an independent variable with the blending controller without disturbing the operation of the blending controller.

The above description has been related to the particular operation of blending butane with gasoline, but the system should not be limited to this particular description. Obviously this system may be used with an controller to cascade or add an independent variable thereto.

I claim as my invention:

1. A circuit for cascading a separate input with a ratio controller comprising:

two auxiliary capacitors;

circuit means coupled to said two auxiliary capacitors to charge them in proportion to the two phenomena;

a reservoir capacitor, said auxiliary capacitors being coupled to said reservoir capacitor to discharge in opposition;

an operational amplifier, said operational amplifier having a capacitor disposed in its feedback circuit, the input signal that is to be cascaded with said ratio controller being supplied to the input of said operational amplifier; and a resistance, said resistance being disposed between the output of the amplifier and said reservoir capacitor.

2. The cascading circuit of claim 1 and in addition a switch means for shorting the output of the operational amplifier to the input of the operational amplifier.

3. The cascading circuit of claim 2 and in addition a time delay relay coupled to short the output of said operational amplifier to the input of the operational amplifier, said time delay relay opening a preset time after closing.

4. A blending controller for controlling the ratio between two streams that are blended to form a mixture, said controller having means for cascading an additional control variable, said blending controller comprising:

a capacitor bridge circuit having two capacitors disposed to be charged and discharged in electrical opposition; a first source of voltage, said first source of voltage being disposed to charge one of said auxiliary capacitors, said first source of voltage being adjusted to control the ratio of the two streams;

a second source of voltage, said second source of voltage being disposed to charge the other of said auxiliary capacitors, said second source of voltage being adjusted to calibrate the blending controller;

an operational amplifier, said amplifier having a capacitor disposed in its feedback circuit, said two auxiliary capacitors being coupled to discharge in opposition to the input of said amplifier, a first switch means for alternately connecting said one auxiliary capacitor to said first source of voltage and to said amplifier, said first switch means being operated at a frequency related to the flow in one stream;

a second switch means for alternatively connecting said other auxiliary capacitor to said second source of voltage and to said amplifier, said second switch means being operated at a frequency related to the flow in the other stream;

a cascade control having a second operational amplifier, a capacitor disposed in the feedback circuit of said second operational amplifier;

an input circuit for said second operational amplifier, a signal representing a control variable being supplied to said input circuit;

a resistance, said resistance being disposed in series in the output circuit of said second operational amplifier;

the output circuit of said second operational amplifier being coupled to the discharge side of the capacitor bridge circuit.

5. The blending controller of claim 4 wherein the size of the resistance is sufficiently large to control the magnitude of the cascade control.

6. The blending controller of claim 4 wherein the control variable and a set point for the variable are supplied to a summing device that supplies an output signal related to the algebraic difference between the two signals, the output signal of said summing device being supplied to said second operational amplifier.

References Cited

UNITED STATES PATENTS

| 3,011,709 | 12/1961 | Jacoby | 235—151 |
| 3,089,643 | 5/1963 | Idzerda et al. | 235—151.12 |
| 3,214,660 | 10/1965 | Smoot | 318—28 |
| 3,290,563 | 12/1966 | Hyer et al. | 330—51 |
| 3,299,258 | 1/1967 | Borsboom et al. | 235—151.34 |
| 3,342,199 | 9/1967 | McEvoy | 235—151.12 XR |

OTHER REFERENCES

Huskey and Korn: Computer Handbook, first edition, 1962, Scientific Library Call Nos. QA/76/H8, McGraw-Hill Book Company, Inc. (pages 4–3 to 4–9 relied on).

EUGENE G. BOTZ, Primary Examiner